Figure 1:
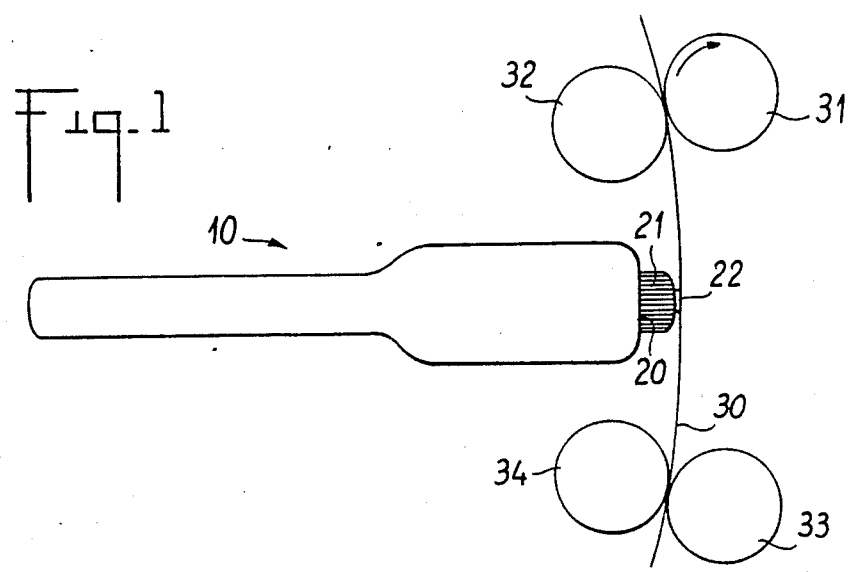

United States Patent [19]

Rosier

[11] Patent Number: 4,694,221
[45] Date of Patent: Sep. 15, 1987

[54] DEVICE FOR THE RESTITUTION AND/OR ANALYZING OF COLOR IMAGES USING LINE-TYPE FIBER OPTICS CATHODE RAY TUBE

[75] Inventor: Jean-Claude Rosier, Gasny, France

[73] Assignee: Societe Europeenne de Propulsion, France

[21] Appl. No.: 886,385

[22] Filed: Jul. 17, 1986

[30] Foreign Application Priority Data

Jul. 23, 1985 [FR] France .............................. 85 11258

[51] Int. Cl.⁴ .............................................. H04N 9/24
[52] U.S. Cl. ..................................... 315/10; 358/901; 358/69; 313/475
[58] Field of Search ..................... 315/10; 358/69, 71, 358/901; 313/475, 467

[56] References Cited

U.S. PATENT DOCUMENTS

| | | |
|---|---|---|
| 3,209,191 | 9/1965 | Hamilton . |
| 3,260,797 | 7/1966 | Valensi ................................... 358/69 |
| 3,299,434 | 1/1967 | McNaney ............................ 358/901 |
| 3,609,233 | 9/1971 | Nagao .................................. 358/901 |
| 3,735,032 | 5/1973 | Goetze et al. . |
| 3,818,131 | 6/1974 | Emmons ............................. 358/901 |
| 4,309,720 | 1/1982 | Denham . |
| 4,459,512 | 7/1984 | Ohhata ................................. 358/69 |
| 4,499,501 | 2/1985 | Eriksen et al. ....................... 358/901 |

FOREIGN PATENT DOCUMENTS 57-154970  9/1982  Japan .
58-6663  1/1983  Japan .

OTHER PUBLICATIONS

Dr. Eiichi Miyazaki, "Facsimile Printing Tubes and Their Applications," *Japan Electronic Engineering*, Mar. 1969, pp. 27–30.

Primary Examiner—Theodore M. Blum
Attorney, Agent, or Firm—Hoffman, Wasson & Fallow

[57] ABSTRACT

A device for the restitution and/or analyzing (digitalizing) of color images on an image carrier, comprising a cathode ray tube with a line screen, an assembly of optical fibers fixed on the front face of the tube screen, a color mask in film form, fixed in front of the optical fibers assembly and carrying at least three lines of different colors, means of scanning the screen by the electron beam of the tube along different lines corresponding to the lines of the color mask; and means of relative displacement between the color mask and an image carrier situated in front of the mask, so that each line of the image is scanned by each of the beams produced by the scannings of the screen along the different lines of colors of the mask.

14 Claims, 10 Drawing Figures

DEVICE FOR THE RESTITUTION AND/OR ANALYZING OF COLOR IMAGES USING LINE-TYPE FIBER OPTICS CATHODE RAY TUBE

The present invention relates to a device for the restitution and/or analyzing of color images.

One particular but non-exclusive field of application of the invention is that of the restitution and/or analyzing of very high resolution images, such as received from observation satellites.

Apparatus already known and used in this particular field, are equipped either with a rotating drum on which a film is lineprinted by means of a modulated light source moving step-wise along the drum, or with a cradle on which a film is applied, then printed or scanned with a light source illuminating a pivoting mirror with line scanning by relative movement between the cradle and the mirror. Reference is made in particular to the U.S. Pat. No. 4,028,732 and to the pending U.S. patent application Ser. No. 778,142 in the name of the applicant.

These known apparatus are fully satisfactory as far as the quality of the results is concerned, but they are relatively expensive because of the conditions that must be met by the mechanical means used for line scanning, in order to obtain the wanted accuracy.

The aim is therefore, to find scanning means which are less expensive but permitting always a high resolution.

It has already been proposed, for the reproduction of color images on a photo-sensitive base medium, to use a line-type fiber optics cathode ray tube, for line-scanning the photo-sensitive base medium. A line-type fiber optics CRT has, over the conventional CRT, two essential characteristics which are, that the scanning is performed exclusively or principally in one direction only, the screen of the tube having an elongated or oblong shape extending in said direction and that the screen of the tube is externally provided with an assembly of optical fibers joined together side by side, which convey to a certain distance from the screen the photons produced by the electron beam.

U.S. Pat. No. 4,309,720 describes a color image reproduction device using a line-type fiber optics CRT, the screen being provided with phosphor bands which supply the different colors. One line of the image to be reproduced is formed by superposing its color components, each color component being produced by scanning the corresponding phoshor band with an electronic beam from the tube.

The use of phosphor bands raises however a number of difficulties.

First, it is necessary, in order to balance the different colors, to have phosphors which produce the same light intensities in response to the same excitation, or, if the phosphors have different quantum yields, to modulate the intensity of the electron beam as a function of the color.

Second, the deposit of phosphor bands is a relatively costly operation, especially so if it is sought to produce very narrow bands.

But even with very elaborate techniques, it is in practice very difficult to satisfactorily produce bands of width less than 200μ.

If a lower resolution is sought, for example around 30μ (spot size), then it is necessary to store a rather large amount of data representing the color components of successive lines in order to be able to restitute said data in the suitable order to produce the color components of the successive lines of image on the image carrier moving continuously in front of the screen.

It is therefore the object of the present invention to provide a device with which it will be possible to realize, for a relatively low cost, the restitution and/or scanning of color images with a high resolution.

This object is reached according to the invention, with a device which comprises:

a cathode ray tube with a line-type screen, an assembly of optical fibers fixed on the front face of the tube screen, a color mask in film form, fixed in front of the assembly of optical fibers and carrying at least three lines of different colors, screen scanning means following different lines corresponding to the color lines of the mask, and means of relative displacement between the color mask and an image carrier situated in front of the mask, so that each line of the image is scanned by each of the beams produced by the screen scannings as a function of the different lines of colors of the mask.

The use of a color mask in film form placed in front of the fiber optics CRT presents definite advantages over the bands of phosphorescent materials.

First, instead of requiring phosphors with relatively narrow emission peaks, it is possible to use a wide spectrum screen.

Next, the lines of colors produced on the mask may be very narrow without this entailing a high production cost. It is for example possible to form lines of several scores of microns width on a color photographic film.

Another fact to be noted is that the choice of colors is virtually illimited and that the control of the intensity of the light beam in each color is easy to make when the mask is manufactured.

In restitution mode, the electron beam of the tube is modulated as a function of an image signal which corresponds to the image to be restituted and which is in data form, each item of data representing a color component of a line of image. The image carrier is moved with respect to the mask in such a way as to form, on said carrier, every line of the image to be restituted, by superposing its color components, each one of which is formed when the image carrier passes in front of the corresponding line of the color mask which is scanned by the electron beam. Buffer registers receive said data representing the color components of the lines of image and are so arranged as to enable sequential readout of said data in the order in which the color components of the lines of the image are formed on the image carrier.

In analyzing mode, the image to be analyzed is linescanned in each one of the colors and the quantity of light which has gone through the image carrier (transmission analyzing of an image on a transparent carrier) or which is reflected by the image carrier (reflection analyzing of an image on an opaque carrier) is sent onto a single detector by means of pickup optics or of fiber optics, in order to be measured and digitalized.

Figure 2:
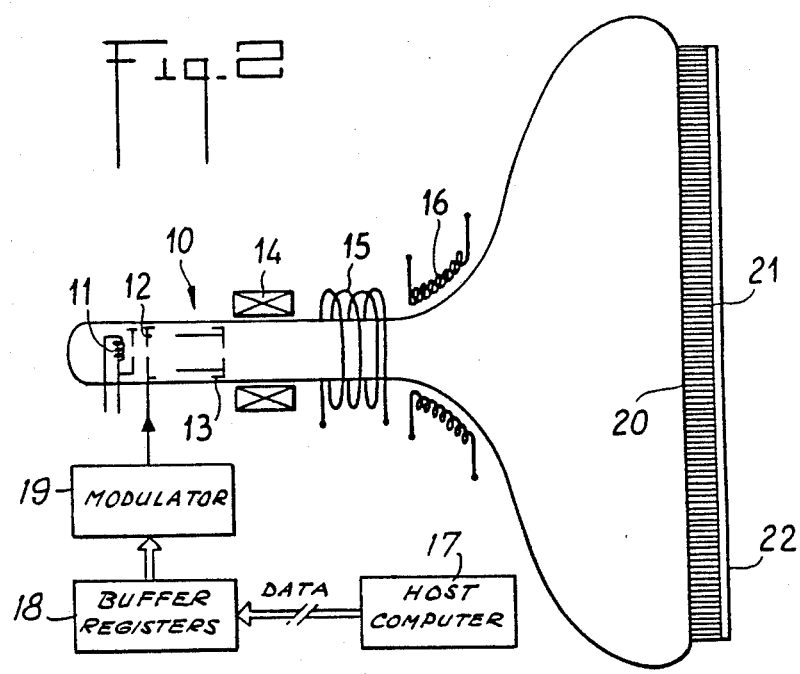
Figure 3:
Figure 4:
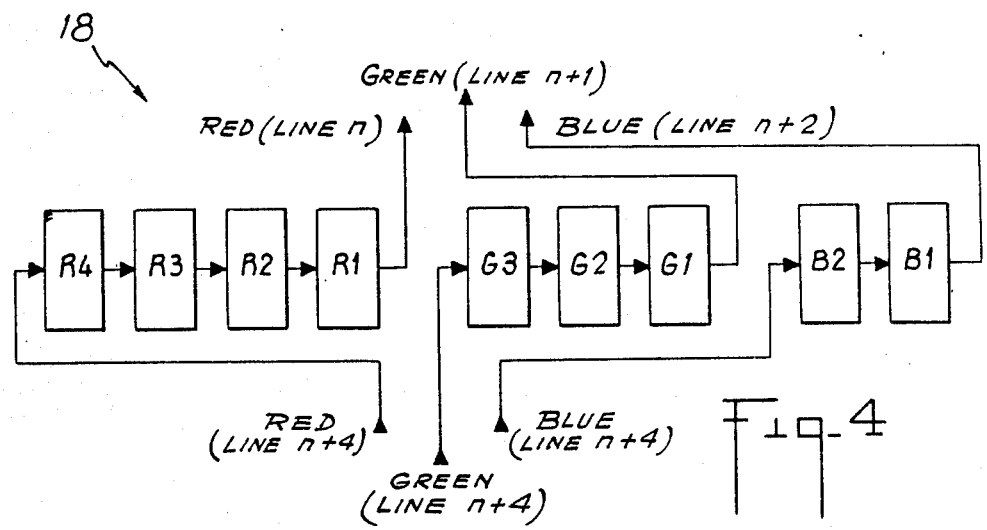
Figure 5:
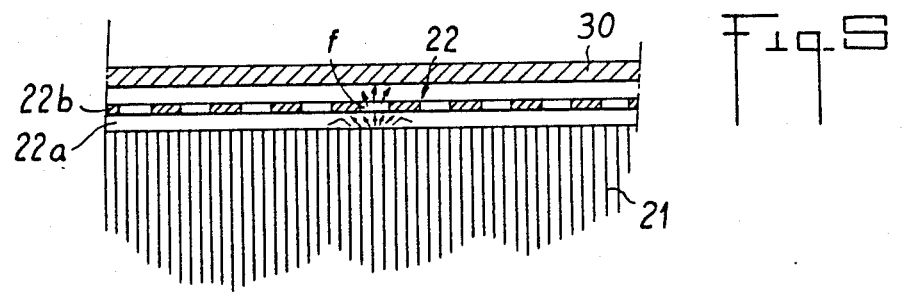
Figure 6:
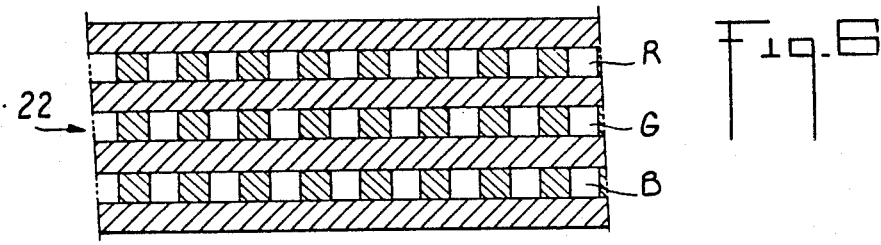
Figure 7:
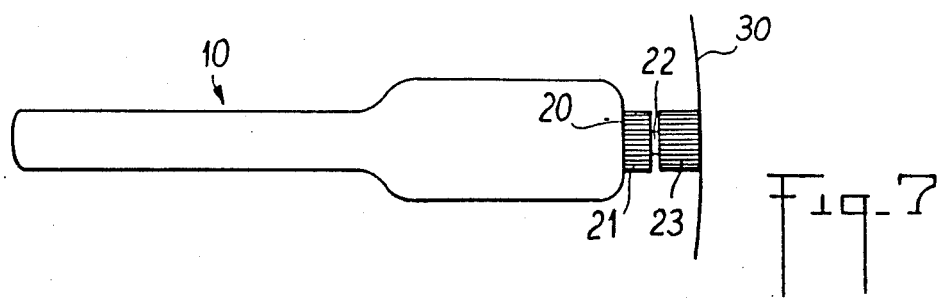
Figure 8:
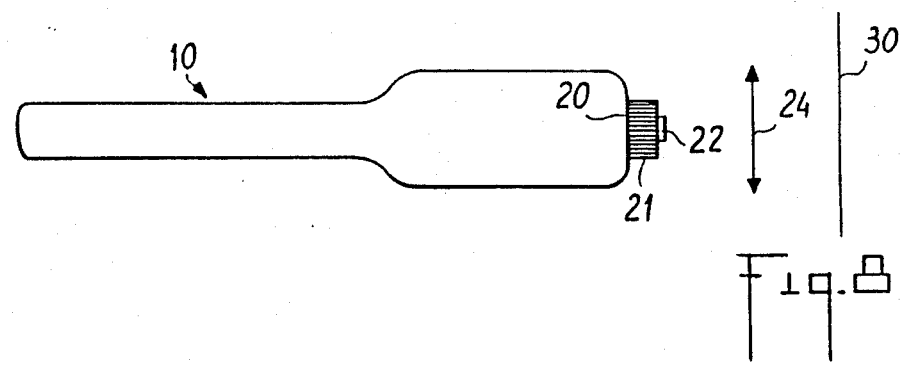
Figure 9:
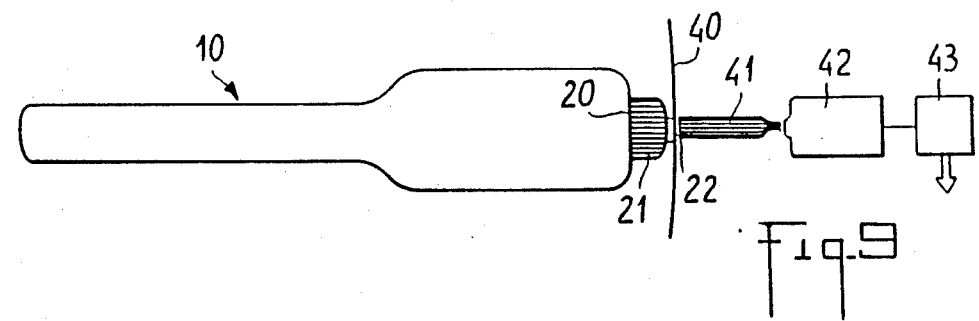
Figure 10:
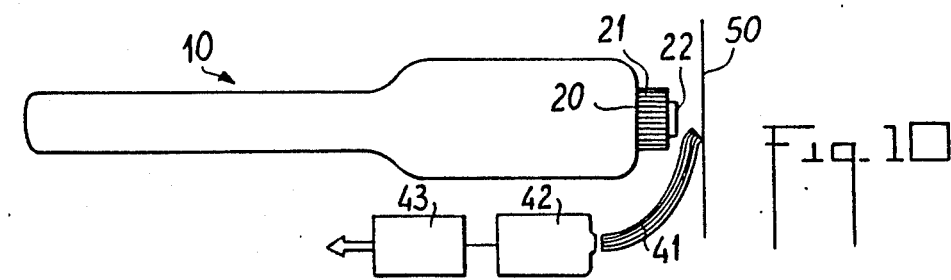

The invention will be more readily understood on reading the following description with reference to the accompanying drawings, in which:

FIG. 1 is a diagrammatical view of a side elevation of a restitution device according to the invention, FIG. 2 is a plan view illustrating in more details the CRT shown in FIG. 1, FIG. 3 is an end view of the CRT shown in FIG. 2, illustrating the mask, FIG. 4 illustrates very diagrammatically the arrangement of the buffer registers wherefrom the data, representing the color components of the lines of an image to be restituted, can be successively retrieved, FIG. 5 is a partial cross-section of a first variant of embodiment of the mask of colors in a device such as shown in FIG. 1, FIG. 6 is a partial plan view of the mask according to the variant illustrated in FIG. 5, FIG. 7 is a cross-section illustrating another variant of embodiment of the front part of the CRT in a device such as shown in FIG. 1, FIG. 8 illustrates yet another variant of embodiment whereby any direct contact is avoided between the color mask and the photo-sensitive base medium on which is formed the image to be restituted, FIG. 9 is a diagrammatical side elevation of a transmission analyzing device according to the invention, and FIG. 10 is a diagrammatical side elevation of an embodiment of a reflection analyzing device according to the invention.

The same references have been used in all the drawings to designate identical or similar parts.

Referring first to FIGS. 1 to 3, these show a restitution apparatus which is essentially composed of a line-type fiber optics CRT, of a color mask, and of means of moving a film in front of the CRT.

As more particularly illustrated in FIGS. 1 and 2, the CRT 10 is flat-shaped with a screen 20 which is essentially unidimensional, with for example a serviceable length of about 250 mm for a serviceable width of 10 mm. From its rear end, the tube 10 comprises an emitter cathode constituted by a filament 11, an electrode 12 (Wehnelt) on which is applied an image signal with a view to modulating the electronic beam emitted by the cathode, an ultor 3, beam-centering coils 14, a dynamic focussing unit 15 for maintaining the spot in the focussed state on the screen all along a scanning line, electromagnetic deflection windings 16 for ensuring in particular the horizontal scanning (line scanning), and the screen 20. The above-recited elements are conventional constituting parts of a CRT. It will however be noted that the use of electromagnetic focussing systems in combination with a high resolution phosphor screen enables the formation of a spot of 30 μm diameter, hence enables the division of every line in 8000 points. Deflection windings 16 also permit a vertical deviation of the beam through the serviceable height of the screen, this enabling a scanning over several different horizontal lines. The amplitude of vertial deviation however remains sufficiently small to prevent the negative and positive distortions inherent to the conventional CRT systems.

A fiber optics window 21 is fixed on the front of the screen 20. Said window 21 is constituted by a large number of optical fibers joined side by side in substantially perpendicular relation to the screen 20. Said fibers carry as far as the front face of the window 21, the photons emitted in response to the impact of the electron beam on the sreen 20. According to one characteristic of the invention, a color mask 22 is fixed in front of the fiber optics window 21. As illustrated in FIG. 3, the mask 22 comprises three lines of colors R, G and B, respectively red, green and blue. Each line has a width substantially equal the diameter of the spot on the screen 20 (for example 30 μm) and the lines are spaced one from the other by a distance substantially equal to their width. The mask 22 is, for example, produced by tracing lines R, G and B on a transparent color film (such as a slide film). To obtain lines which are absolutely straight and in parallel relation to one another, and which have the required width, a high resolution color restitution apparatus of the prior art type is advantageously used, such as the one described in the above-mentioned U.S. Pat. No. 4,028,732 and U.S. patent application Ser. No. 778,142, or the one produced by the French company Société Européenne de Propulsion, assignee of this invention, under the name "Vizircolor". The screen 20 is selected to have a wide spectrum of emission comprising the three colors R,G,B, or at least a spectrum having peaks of emission in each of these colors.

The image carrier on which the image to be restituted must be reproduced is, for example, constituted by a film 30 which is applied on the mask 22 and driven in a direction perpendicular to the horizontal scanning axis of tube 10, this in order to perform the vertical scanning (field sweep). Film 30 is moved by means of a pair of rollers 31, 32 which exert a pulling action on the film 30 after this film has passed in front of the mask 22. Drive roller 31 is applied on the rear face or base of film 30 whereas follower 32 which is freely rotatable, is applied on the other face of film 30 (emulsion side); the result is that the pulling force is exerted on the less delicate side. Before reaching to the level of tube 10, the film 30 passes between two rollers 33, 34 on which is applied a couple which is slightly resistant to the forward movement of the film so as to ensure a complete contact of said film with the mask 22. The outer face of the fiber optics window 21 and the mask 22 have a rounded vertical profile designed to help the application of the film.

Other types of image carriers may be used, such as film packs. The field sweep drive is performed for example by fastening the film pack to a carriage which is moved in front of the tube 10 while applying the film against the color mask.

By scanning the tube screen along lines corresponding to the three lines of colors of the mask 22 (passage from one line to the other being achieved by actuating vertical deflection means), three sources of light, red, green and blue, are obtained.

The restitution of an image is carried out from the digital data supplied to the restitution apparatus from a host computer 17 and comprising data blocks, each one representing the color components of the different lines of the image. The received data is stored temporarily in buffer registers 18 before being applied to a modulator 19 supplying the image signal which controls the electrode 12. The film 30 being stationary, the red component of line 1, the green component of line 2 and the blue component of line 3 are printed. Then, film 30 is moved of a distance corresponding to the pitch between the lines of mask 22, then a new sequence starts during which on the green component of line 2 is superimposed its red component, on the blue component of line 3 is superimposed its green component and the blue component of line 4 is printed. The film is then moved again and the same scanning sequence is repeated, so as to complete line 3 as its three blue, green and red components are printed.

Generally, the information representing a color image is available in a format which uses a line multiplexing of the data for every color. For example, there are successive blocks which correspond respectively to: red component of line 1, blue component of line 1, green component of line 1, red component of line 2, and so on. Thus, before being applied to the restitution apparatus, the information available in the form of a line multiplexing of the data for each component, must be reorganized by means of buffer registers 18 such as illustrated in FIG. 4. The data corresponding to the red components of four successive lines of tiers n+3, n+2, n+1, n are recorded in registers R4, R3, R2 and R1, the data corresponding to the green components of the lines of tiers n+3, n+2 and n+1 are recorded in registers G3, G2 and G1 and the data corresponding to the blue components of the lines of tiers n+3 and n+2 are recorded in registers B2 and B1. Sequential read-out of registers R1, G1, B1 enables the printing of the red n, the green (n+1) and the blue (n+2) components, film 30 being stationary. The contents of registers R4, R3, R2, G3, G2 and B2 are then respectively transferred in registers R3, R2, R1, G2, G1 and B1, the data corresponding to red, green and blue components of the line of tier n+4 are loaded in registers R4, G3 and B2 and, the film having been moved of the distance corresponding to the pitch between lines, registers R1, G1, B1 are once again read sequentially for the printing of the red (n+1), green (n+2) and blue (n+3) components. This procedure is repeated until the end of the restitution of the image.

The line scanning being exactly perpendicular to the field sweep direction, it is important to keep the film 30 motionless during the printing of every line. Indeed, if not, the continuous forward movement of the film would cause a systematic inclination of the printed lines.

But the bi-directional scanning of the tube 10 authorizes a number of geometrical corrections in real time during the restitution of the image.

For example, it is possible to incline the scanning lines on the screen by actuating the deflecting means, so that the application of a tension in ramp form on the vertical deflection amplifier, compensates the inclination caused by field sweep performed continuously. In this way, the film 30 can be driven continuously. It becomes then necessary, of course, to direct the lines of the color mask in parallel relation to the scanning lines inclined on the screen.

The inclinability of the line scanning direction also helps to improve the alignment of the mask with said scanning direction.

It is further possible, during a line scanning operation, to alter the speed of the electron beam by actuating the horizontal deflection means. Acceleration or deceleration of the beam in any portion of the line enables the interpolation of the picture elements (pixels), i.e. a variation along the line, of the pitch of the pixels of the restituted image with respect to the pixels of the recorded image. The possibility of making geometrical corrections on the image, in real time and during restitution, is an advantage over the restitution apparatuses using an essentially mechanical scanning and which, by their very inertia, are compelled to make scannings at constant speeds.

With the device illustrated in FIGS. 1 and 2, it is necessary to use a mask 22 as thin as possible in order to limit the width of the gap between the fiber optics window 21 and the film 20, this in order to prevent a dispersion of the light issued from the optical fibers.

The mask 22 being produced by printing a color film, it is possible to "peel" the emulsion from the film and to deposit it directly on the fiber optics window 21. The extra thickness created by the emulsion is then limited to a few microns, against about 200μ for the complete film.

However, the continuous displacement of the film to be printed, in contact with the mask, risks to cause, at a long or short range, first an abrasion, then a peeling off of the mask.

It is in that case possible to protect the mask 22 by coating its outer face with a thin layer of protective material, such as for example a resin containing a hardening agent, or a semi-transparent metallic coating deposited by evaporation.

Another solution to prevent abrasion consists in moving the film without keeping it in contact with the mask 22, while avoiding the problems linked to the dispersion of the light issued from the optical fibers.

Thus, according to the variant illustrated (on an enlarged scale) in FIGS. 5 and 6, the mask 22 is constituted by a film, with its base 22a bonded on the fibers of window 21 and the emulsion 22b (not "peeled") situated on the external side. The color lines are constituted by a succession of elementary segments separated one from the other by opaque segments, the lines being also separated one from the other by opaque lines. The segments of the lines of the mask correspond to the pixels of the lines of the image to be restituted. Mask 22 thus forms, as illustrated in FIG. 6, a check pattern of which the colored squares are separated one from the other by black edges of substantially constant thickness.

The film 30 to be printed is a small distance away from the mask 22. As illustrated in FIG. 5, the light issued from the fibers during the scanning of one line of the screen only reaches the segments of the corresponding line of the mask. Indeed, the photons dispersing on the fibers output are either absorbed by the black areas bordering the segments, or they are trapped by successive reflections within the base 22a when their angle of emergence on the fibers output is inclined low with respect to the normal of the mask. In addition, the black areas defining the segments of the lines of the mask enable the accurate separation of the light information which corresponds to the different elements of one line of the image even when the film 30 is slightly apart from the mask.

Other solutions are possible to prevent the abrasion of the mask.

For example, a thin mask 22, such as that used in the apparatus illustrated in FIGS. 1 and 2 can be placed between the flat faces opposite the fiber optics window 21 and an additional block 23 of optical fibers on the outer face of which is applied the film to be printed (FIG. 7). In order to help the application of the film, the external face of the optical fibers 23 is rounded. To perfect the optical coupling between the blocks of fibers 21 and 23, the free space between these blocks can be filled with a liquid of adapted index (such as Canada balsam).

FIG. 8 further illustrates another embodiment whereby abrasion of the mask 22 can be avoided. Said mask is produced from a transparent positive color film on which red, green and blue lines have been printed. Mask 22 is placed, emulsion side first, on the fiber optics window 21, the optical fibers having a flat external face. The image of the mask is picked up by an optical system 24 in order to be formed on the film 30 to be printed, which film is situated at a distance from the tube 10. By altering the magnifying power of the optical system 24, it is possible to enlarge the image formed on the film.

FIGS. 9 and 10 illustrate two embodiments of a color image analyzing (digitalizing) apparatus which constitutes another aspect of the invention.

FIG. 9 shows the same tube 10 as that shown in FIGS. 1 and 2, with a screen 20 equipped with a fiber optics window 21 the front face of which carries a mask 22, the screen having a wide emission spectrum or at least, peaks of emission in the colors of the mask. But, contrary to the tube of the restitution apparatus, the tube of the analyzing apparatus receives a constant video signal to constitute, with the R, G, B lines of the mask, three sources of red, green and blue lights. The image to be analyzed (digitalized) is carried by a transparent film 40, which is moved while being applied against the mask 22 in order to perform a field sweep (the front face of the window 21 in optical fibers and of the mask 22 is rounded to help the application of the film 40). The light going through the film 40 is picked up by a web 41 of optical fibers in order to be sent onto a single detector 40 constituted by an opto-electronic device, such as a photomultiplier which delivers an electrical analog signal. This signal is converted to digital form by means of an analog-to-digital converter 43. It will be noted that the web of optical fibers 41 is so placed as to be able to pickup the light produced during the scanning of each line of colors of the mask 22.

The operation in analyzing mode is the same as that in restitution mode.

The film 40 being stationary, lines R, G and B of the mask are scanned successively. The data blocks constituted by the resulting digital signal corresponding to the different color components are recorded in buffer registers arranged in reverse to what is illustrated in FIG. 4. After a sequence where three lines of the mask are scanned, the film 40 is moved of a distance equal to the pitch between the lines and a new scanning sequence is then performed. The data introduced in the buffer registers is read in order to be stored, for example on a magnetic tape with the format corresponding to the line multiplexing of the red, green and blue data.

As indicated hereinabove for the restitution apparatus, an operation of the analyzing apparatus with a continuous feed of the image carrier is possible by providing a line scanning directed so as to have the suitable inclination.

FIG. 9 illustrates a transmission analyzing apparatus for analyzing an image carried by a transparent carrier. In the case of an image carried by an opaque carrier, it will be possible to use the reflection analyzing apparatus illustrated in FIG. 10.

The apparatus according to FIG. 10 differs from that according to FIG. 9 in that the image carrier 50 carrying the image to be scanned is kept at a distance from the flat front face of the mask 22. Thus, the end of the web of optical fibers 41 can be brought in the interval between the mask 22 and the image carrier 50 in order to pick up part of the light reflected by the latter during the scanning of every line of the mask. For the rest, the apparatus according to FIG. 8 works in the same way as the apparatus according to FIG. 9.

It will be noted that the use of mask 22 for analyzing the colors, prevents the need of using three detection systems, one for each color, with suitable means of separating the colors as this is the case when the color analyzing is performed with a source of white light.

Moreover, the use of the web of optical fibers 41 to collect the light which has gone through the image carrier or which is reflected by the latter is preferable to a pickup optical system because of its improved optical yield.

The foregoing description has considered the use of a mask formed on a positive color film with red, green and blue lines. But it is also possible to produce the mask on a negative color film with lines having yellow, magenta and cyan colors.

What is claimed is:

1. Device for the restitution of a color image on an image carrier, comprising:
   a cathode ray tube provided with a line screen;
   an assembly of optical fibers fixed on the front face of said cathode tube line screen;
   a color mask in film form, fixed in front of said assembly of optical fibers and provided with at least three lines of different colors;
   means for scanning said line screen by the electron beam of said tube along different lines corresponding to the lines of said color mask;
   means for modulating the electron beam of said tube as a function of an image singal which corresponds to the image to be restituted and which is produced from data representing a color component of a line of image;
   buffer registers receiving data representing the color components of the lines of image and coupled to said modulation means, said buffer registers being so arranged as to enable sequential reading of the data in the order in which the color components of the lines of the image are formed on the image carrier; and
   means providing relative displacement between said color mask and the image carrier situated in front of the mask so as to form on the carrier each line of the image to be restituted by superimposition of its color components each one being formed when the image carrier passes in front of the corresponding line of said color mask scanned by the electron beam, wherein each image line is scanned a plurality of times equal to the number of different colors provided on said color mask, each scan utilizing a unique set of data not necessarily equal to the set of data used for preceding or subsequent scans.

2. Device as claimed in claim 1, wherein the image carrier and said color mask are moved one with respect to the other stepwise, in a direction perpendicular to the direction of the lines of the mask.

3. Device as claimed in claim 1, wherein the image carrier and said color mask are moved one with respect to the other in continuous manner, and the lines of colors of the mask are inclined with respect to the perpendicular to the direction of relative displacement between the mas and the image carrier.

4. Device as claimed in claim 1, wherein said color mask is coated with a transparent protective layer on its external face against which the image carrier is moved with respect to said color mask.

5. Device as claimed in claim 1, further including a second assembly of optical fibers fixed to the front of said color mask, the image carrier being moved with respect to said color mask in front of said second assembly of optical fibers.

6. Device as claimed in claim 1, further including an optical system provided between said color mask and the image carrier.

7. Device as claimed in claim 1, wherein each line of said color mask is formed of elementary segments separated from one another by opaque segments and separated from each adjacent line by an opaque line.

8. Device for analyzing a color image carried by an image carrier, comprising:
   a cathode ray tube provided with a line screen;
   a first assembly of optical fibers fixed on the front face of said cathode ray tube screen;
   a color mask in film form, fixed in front of said first assembly of optical fibers, said color mask provided with at least three lines of different colors;
   means of scanning the screen by the electron beam of said cathode ray tube along different lines corresponding to the lines of the color mask;
   means of relative displacement between said color mask and the image carrier situated in front of said mask, such that each line of the color image is scanned by each of the beams produced by the scannings of the screen along the different lines of colors of said mask;
   a second assembly of optical fibers for transmitting light, said second assembly having a first end situated close to the image carrier to pick up the light signals representing color components of the different lines of the image; and
   detection means situated close to the second end of said second assembly of optical fibers for converting the light signals to digital data, wherein each color image line is scanned a plurality of times equal to the number of different colors provided on said color mask, each scan producing a unique set of data not necessarily equal to the set of data produced in preceding or subsequent scans.

9. Device as claimed in claim 8, wherein the image carrier is transparent and is situated between said color mask and said second assembly of optical fibers thereby sensing the light which has passed through the image carrier.

10. Device as claimed in cliam 8, wherein the image carrier is opaque and said second assembly of optical fibers have their first end situated in an interval provided between said color mask and the image mask and the image carrier to pick up the light reflected by the image carrier.

11. Device as claimed in claim 8, wherein said color mask is provided with a transparent protective coating on its external face against which the image carrier is moved relatively to said color mask.

12. Device as claimed in claim 8, wherein a third assembly of optical fibers is fixed before said color mask in front of said third sssembly of optical fibers.

13. Device as claimed in claim 8, wherein an optical system is provided between said color mask and the image carrier.

14. Device as claimed in claim 8, wherein each line of the color mask is formed of elementary segments separated one from the other by opaque segments, and is separated from each adjacent line by an opaque line.

* * * * *